(12) United States Patent
Chacko et al.

(10) Patent No.: US 10,037,264 B2
(45) Date of Patent: Jul. 31, 2018

(54) TEST SUITE MINIMIZATION

(71) Applicant: HCL Technologies Limited, Uttar Pradesh (IN)

(72) Inventors: Simy Chacko, Andhra Pradesh (IN); Satya Sai Prakash Kanakadandi, Andhra Pradesh (IN); S U M Prasad Dhanyamraju, Andhra Pradesh (IN)

(73) Assignee: HCL TECHNOLOGIES LTD. (IN)

( * ) Notice: Subject to any disclaimer, the term of this patent is extended or adjusted under 35 U.S.C. 154(b) by 148 days.

(21) Appl. No.: 15/063,924

(22) Filed: Mar. 8, 2016

(65) Prior Publication Data
US 2016/0321169 A1    Nov. 3, 2016

(30) Foreign Application Priority Data

Apr. 29, 2015   (IN) .......................... 1188/DEL/2015

(51) Int. Cl.
*G06F 11/36* (2006.01)
(52) U.S. Cl.
CPC ........ *G06F 11/3684* (2013.01); *G06F 11/368* (2013.01)
(58) Field of Classification Search
None
See application file for complete search history.

(56) References Cited

U.S. PATENT DOCUMENTS

| | | | | |
|---|---|---|---|---|
| 5,629,878 A * | 5/1997 | Kobrosly | ............ | G06F 11/3684 702/120 |
| 7,165,074 B2 * | 1/2007 | Avvari | ................ | G06F 11/3676 707/999.01 |
| 7,506,312 B1 * | 3/2009 | Girolami-Rose | ......... | G06F 8/71 717/101 |
| 8,239,826 B2 * | 8/2012 | Elenburg | ............ | G06F 11/3414 717/110 |
| 8,473,914 B2 * | 6/2013 | Bergman | ............ | G06F 11/3684 717/124 |

(Continued)

FOREIGN PATENT DOCUMENTS

CN    102193864    2/2014

OTHER PUBLICATIONS

David Banks et al., Preliminary Success Estimates for Approaches based on Binomial Models, Coverage Designs, Mutation Testing, and Usage Models, Software Testing by Statistical Methods, Mar. 12, 1998, Number of pp. 37, USA.

(Continued)

*Primary Examiner* — Chat Do
*Assistant Examiner* — Douglas Slachta
(74) *Attorney, Agent, or Firm* — Hayes Soloway P.C.

(57) ABSTRACT

Disclosed is a method and system for classifying test cases. In one implementation, the method comprises creating a test step master list comprising a plurality of test case, one more test step associated with the plurality of test case, and a test step identification number associated with the one more test step. Further, the method comprises generating a sequence diagram for each of the plurality of test cases based on the test step master list. Furthermore, the method comprises classifying, by the processor, each of the plurality of test cases in to an independent test case or an asynchronous test case or a synchronous test case based on the sequence diagram.

17 Claims, 3 Drawing Sheets

(56) References Cited

U.S. PATENT DOCUMENTS

| | | | |
|---|---|---|---|
| 8,819,642 B2 | 8/2014 | Bhat et al. | |
| 9,201,776 B1* | 12/2015 | Cohen | G06F 9/44589 |
| 9,317,404 B1* | 4/2016 | Cohen | G06F 11/3684 |
| 9,335,987 B2* | 5/2016 | Bhuiya | G06F 11/3684 |
| 2008/0172652 A1* | 7/2008 | Davia | G06F 11/3684 717/124 |
| 2010/0058300 A1* | 3/2010 | Zeng | G06F 11/3676 717/131 |
| 2010/0287534 A1* | 11/2010 | Vangala | G06F 11/3612 717/124 |
| 2011/0016452 A1* | 1/2011 | Gorthi | G06F 11/3688 717/124 |
| 2011/0289488 A1* | 11/2011 | Ghosh | G06F 11/3684 717/131 |
| 2012/0192153 A1* | 7/2012 | Venkatraman | G06F 11/3664 717/124 |
| 2013/0041900 A1* | 2/2013 | McCoy | G06F 17/30286 707/737 |
| 2013/0198567 A1* | 8/2013 | Ahmed | G06F 11/3684 714/32 |
| 2015/0286556 A1* | 10/2015 | Ellis | G06F 11/3684 717/125 |
| 2016/0196021 A1* | 7/2016 | Rahulkrishna | G06F 11/3688 715/760 |

OTHER PUBLICATIONS

Saeed Parsa & Alireza Khalilian, On the Optimization Approach towards Test Suite Minimization, International Journal of Software Engineering and Its Applications, Jan. 2010, p. 15-28, vol. 4, No. 1, Iran.

S. Shanmuga Priya & P. D. Sheba Kezia Malarchelvi, Test Path Generation Using Uml Sequence Diagram, International Journal of Advanced Research in Computer Science and Software Engineering, Apr. 2013, p. 1069-1076, vol. 3, Issue 4, India.

* cited by examiner

TEST SUITE MINIMIZATION

CROSS-REFERENCE TO RELATED APPLICATIONS AND PRIORITY

The present application claims benefit from Indian Complete Patent Application No. 1188/DEL/2015, filed on Apr. 29, 2015, the entirety of which is hereby incorporated by reference.

TECHNICAL FIELD

The present subject matter described herein, in general, relates to a system and a method for test suite minimization, and more particularly a system and a method for classifying a test case to enable test suite execution time minimization.

BACKGROUND

Software testing is the process of evaluating software to assess the quality of the software. Software testing may also be understood as a test conducted on a software application to provide a user with information on the quality of the software application. Furthermore, the software testing may also provide an independent opinion of the software application to allow the user to appreciate and understand the risks of the software application implementation.

The software testing techniques are mainly classified as black box testing technique or white box testing technique. Generally, black box testing ignores the internal mechanism of the software application and focuses on the output generated against any input and execution of the software application. White box testing considers the internal mechanism of a software application.

Generally, test suites comprise test cases which are used in software testing. The test cases may further comprise one or more test steps and require test-beds for execution. Further, the test-beds and other resources for example databases, operating environments and browsers are physical and finite in nature.

Typically, the test suites comprising test cases and test steps grow over time due to addition of new test cases and test steps. Subsequent utilization of such grown test suites during software testing results in database locking, wastage of time and resources. Moreover due to the physical and finite nature of the test-beds and other resources, frequent unplanned time delays are encountered and thus impacting deadlines, effort and time.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a system and a method for classifying a test case. This summary is not intended to identify essential features of the claimed subject matter nor is it intended for use in determining or limiting the scope of the claimed subject matter.

In one implementation, a system for classifying a test case of a test suite is disclosed. In one aspect, the system may create a test step master list comprising a plurality of test case, one more test step associated with the plurality of test case, and a test step identification number associated with the one more test step. Upon creation, the system may generate a sequence diagram for each of the plurality of test cases based on the test step master list. Further to generation, the system may classify each of the plurality of test cases in to an independent test case or an asynchronous test case or a synchronous test case based on the sequence diagram.

In another implementation, a method for classifying a test case is disclosed. In one aspect, in order to classify test cases, initially a test step master list may be created. The test step master list comprises a plurality of test case, one more test step associated with the plurality of test case, and a test step identification number associated with the one more test step. Further, a sequence diagram may be generated based on the test step master list for each of the plurality of test cases. Upon generation, each of the plurality of test cases may be classified in to an independent test case or an asynchronous test case or a synchronous test case based on the sequence diagram.

In yet another implementation, non-transitory computer readable medium embodying a program executable in a computing device for classifying a test case is disclosed. The program may comprise a program code for creating a test step master list. The test step master list comprises a plurality of test case, one more test step associated with the plurality of test case, and a test step identification number associated with the one more test step. Further, the program may comprise a program code for generating a sequence diagram utilizing the test step master list for each of the plurality of test cases. Furthermore, the program may comprise a program code for classifying each of the plurality of test cases in to an independent test case or an asynchronous test case or a synchronous test case utilizing the sequence diagram to enable optimization of a test suite.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Figure 1:
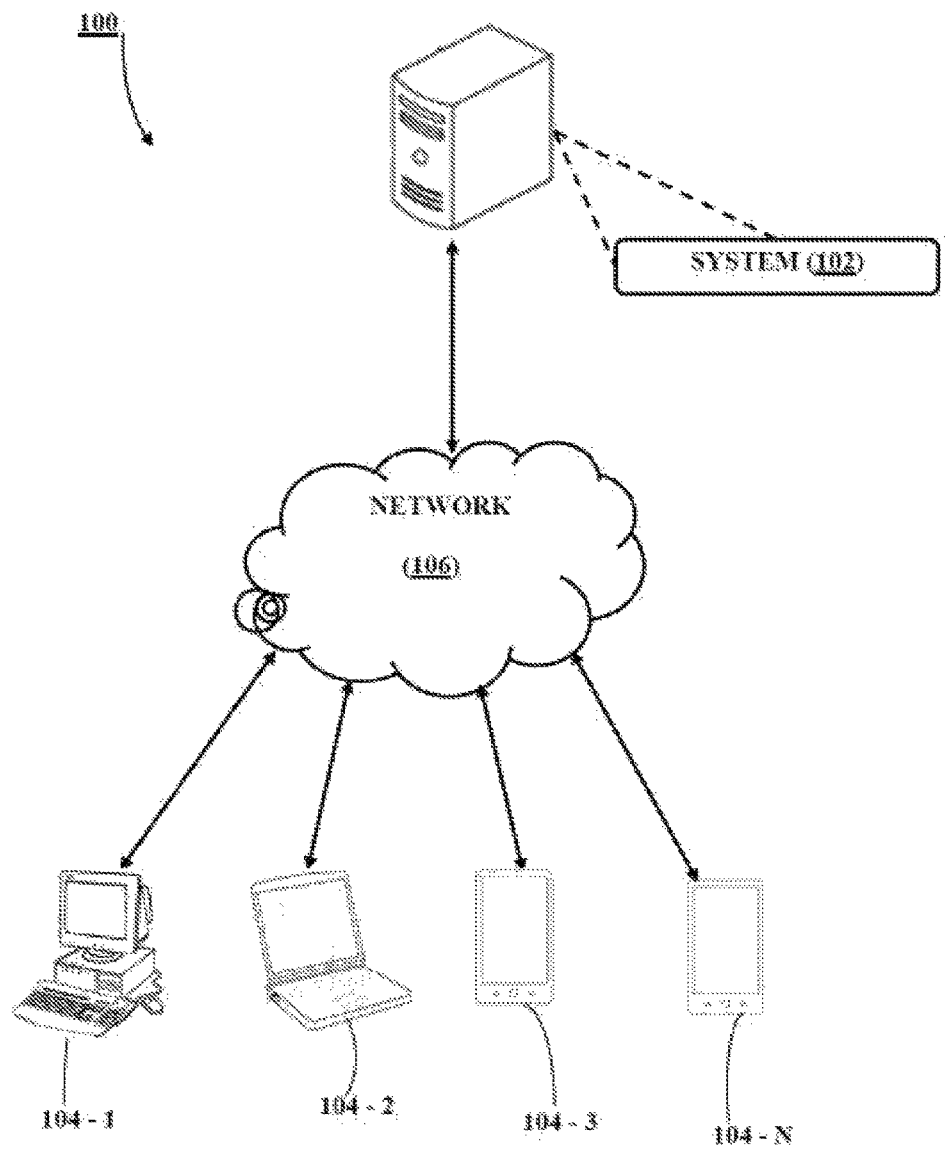
FIG. 1 illustrates a network implementation of a system for classifying test cases, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

In an implementation, a system and method for classifying a plurality of test case, is described. In the implementation, a plurality of test case may be obtained. In an example the plurality of test cases may be obtained from a test case repository. Upon obtaining the plurality of test cases, one or more test steps may be extracted from each of the test case. Further to the extraction, each test step may be assigned a test step identification number. The step identification number may be indicative of unique number.

Subsequent to the assigning, a test step master list may be created. The test step master list comprises the plurality of test cases, one or more test steps associated the plurality of test cases, and the test step identification number associated with the one or more test steps. In an example, a regular expressions technique may be utilized for creating the tests step master list. In another example, a text parsing technique may be utilized for creating the tests step master list.

In the implementation, further to creating the tests step master list, an execution repository and a bug repository may be mined for data. In one example Apriori technique may be used for mining. In another example, an equivalence class transformation technique may be used for mining. In one example, frequent pattern growth technique may be used for mining In one more example, Apriori-DP technique may be used for mining Further, the tests step master duplicate test cases are identified and deleted based on the data obtained from mining.

In the implementation, upon deleting, a sequence diagram may be generated for each of the plurality of test cases based on the test step master list. In an implementation, the sequence diagram enable visualization of one or more test steps of a test case. In an example, a text mining parsing technique may be used for generating the sequence diagram. In one other example, a static source code parsing analysis technique may be used for generating the sequence diagram.

Subsequent to generation of the sequence diagram, each of the plurality of test cases may be classified in to an independent test case or an asynchronous test case or a synchronous test case based on the sequence diagram. In an example, the independent test case may be understood as the test case comprising one or more tests steps, where the test steps have zero overlap with one or more tests steps of another tests case. In an example, the asynchronous test case may be understood as the test case comprising one or more tests steps, where the test steps have unsynchronized overlap with one or more tests steps of another tests case. In an example, the synchronous test case may be understood as the test case comprising one or more tests steps, where the test steps have synchronized overlap with one or more tests steps of another tests case.

In another example, a minimum common path algorithm may be used for classification. In the example, the minimum common path algorithm may identify a common path based on the step identification number. Further, in an example, the test cases may be classified based on the common path and a predefined criterion. In one example, the predefined criterion may include a longest common path. In another example, the predefined criterion may include a smallest common path but maximum number of test cases. In one example, the predefined criterion may include maximum number of test cases sharing common path. In another example, a predefined criterion may also include an entry criterion and an exit criterion.

In one more example, the minimum common path algorithm may be used for identifying a common path. Further a custom algorithm may be used for evaluating common entry and exit criterion of the test cases that share the common path. Further, based on the evaluation the each of the plurality of test cases may be classified in to an independent test case or an asynchronous test case or a synchronous test case.

Further, the classified tests cases may be provided to the user for effective planning of the software tests. Thus enabling tests suite run/execution time minimization. In one more implementation, the sequence diagrams may also be provided to the user for visualization. In one more implementation, the test step master list may be provided, where in the test step master list comprises tests cases grouped as the independent test case or the asynchronous test case or the synchronous test case.

Referring now to FIG. 1, a network implementation of a system 102 for classifying a test case, in accordance with an embodiment of the present subject matter may be described. In one embodiment, the present subject matter is explained considering that the system 102 may be implemented as a standalone system connects to a network. It may be understood that the system 102 may also be implemented in a variety of computing systems, such as a laptop computer, a desktop computer, a notebook, a workstation, a mainframe computer, a server, a network server, a cloud-based computing environment and the like.

In one implementation, the system 102 may comprise the cloud-based computing environment in which the user may operate individual computing systems configured to execute remotely located applications. In another embodiment, the system 102 may also be implemented on a client device hereinafter referred to as a user device 104. It may be understood that the system implemented on the client device supports a plurality of browsers and all viewports. Examples of the plurality of browsers may include, but not limited to, Chrome™, Mozilla™, Internet Explorer™, Safari™, and Opera™. It will also be understood that the system 102 may be accessed by multiple users through one or more user devices 104-1, 104-2 . . . and 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
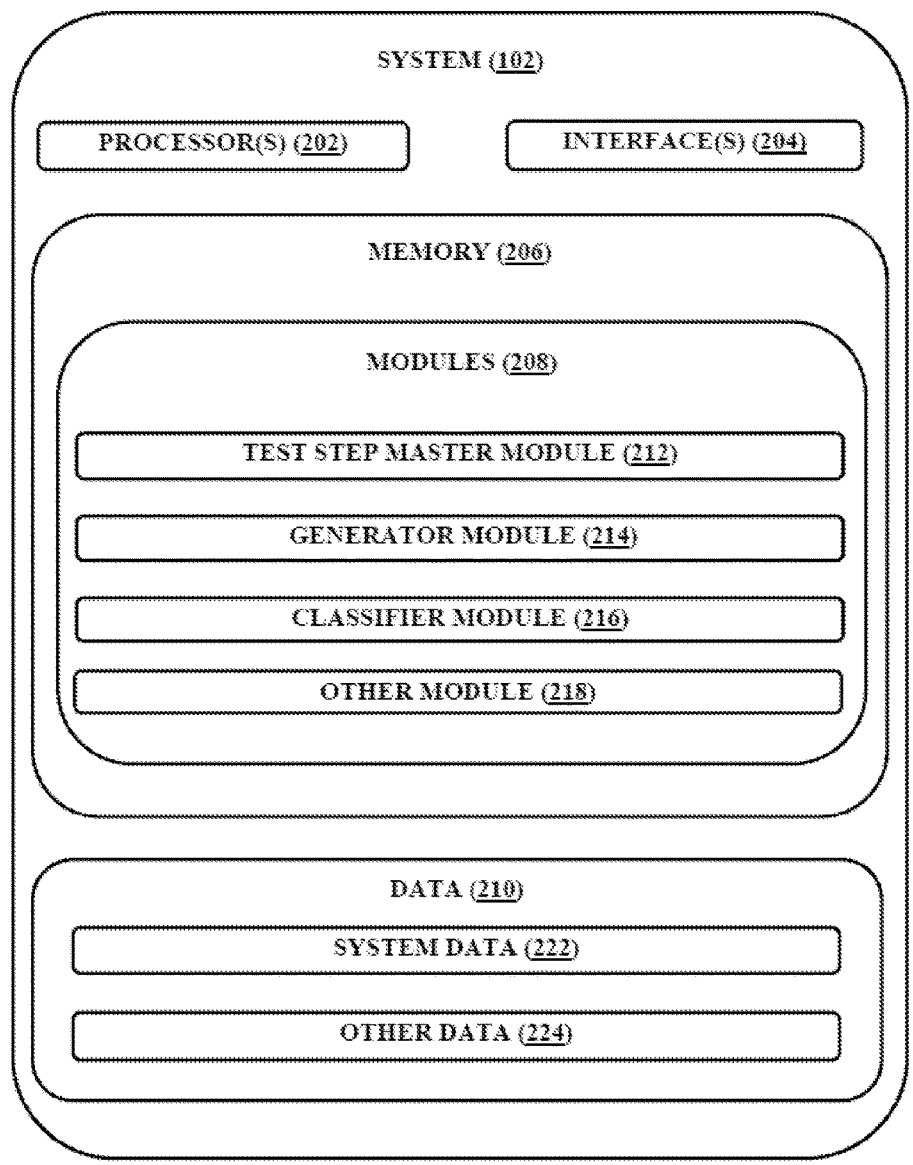
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a test step master module 212, a generator module 214, a classifier module 216 and an other module 218. The other modules 218 may include programs or coded instructions that supplement applications and functions of the system 102. The modules 208 described herein may be implemented as software modules that may be executed in the cloud-based computing environment of the system 102.

The memory 206, amongst other things, serves as a repository for storing data processed, received, and generated by one or more of the modules 208. The memory 206 may include data generated as a result of the execution of one or more modules in the other module 220. In one implementation, the memory may include data 210. Further, the data 210 may include a system data 222 for storing data processed, received, and generated by one or more of the modules 208. Furthermore, the data 210 may include other data 224 for storing data generated as a result of the execution of one or more modules in the other module 220.

In one implementation, at first, a user may use the client device 104 to access the system 102 via the I/O interface 204. The user may register them using the I/O interface 204 in order to use the system 102. In one aspect, the user may access the I/O interface 204 of the system 102 for classifying a test case.

Test Step Master Module 212

Referring to FIG. 2, in an embodiment the test step master module 212 may obtain a plurality of test case. In an example, the test case may be understood as a set of conditions. Further in the example, the test case may be used to establish or identify whether an application or a software system or features of the application and the software system are functioning as expected. In other example the test case may be obtained from a tests suite. Further, the tests suite may be understood as a collection of test cases. In one example, the plurality of test cases may be obtained from a test case repository. In an example, a tests case repository me be understood as a collection of test cases stored in a database. Upon obtaining the plurality of test cases, one or more test steps may be extracted from each of the test case. Further to the extraction, each test step may be assigned a test step identification number. In an example, the step identification number may be understood as a unique number.

Subsequent to the assigning, a test step master list may be created. The test step master list may comprise the test cases, one or more test steps associated to each of the test cases, and the test step identification number associated to the one or more test steps. In an example, a regular expressions technique may be utilized for creating the tests step master list. Further, the regular expressions technique may be understood a sequence of symbols and characters expressing a string or pattern to be searched for within a piece of text. In another example, a text parsing technique may be utilized for creating the tests step master list. Further, text parsing technique may be understood as a process of analyzing a string of symbols, either in natural language or in computer languages, conforming to the rules of a formal grammar.

In the implementation, the test step master module 212 may store the test step master list in system data 222.

Generator Module 214

In the embodiment, further to the creation of the test step master list, the generator module 214 may mine an execution repository and a bug repository data. In one example, a Apriori technique may be used for mining Further, the Apriori technique may be understood as a technique for frequent item set mining and association rule learning over a transactional database. In another example, an equivalence class transformation technique may be used for mining. Further, the equivalence class transformation technique may be understood as a depth-first search algorithm using set intersection. In one more example, a frequent pattern growth technique may be used for mining. In one more example, an Apriori-DP technique may be used for mining Further, the Apriori-DP technique may be understood as an Apriori technique utilizing dynamic programming in frequent item set mining Upon mining, duplicate test cases are identified and deleted based on the data obtained from mining.

In the implementation, upon deletion, a sequence diagram may be generated for each of the plurality of test cases based on the test step master list. In an implementation, the sequence diagram enables visualization of one or more test steps of a test case. In an example, a text mining parsing technique may be used for generating the sequence diagram. Further, the text mining parsing technique may be understood as a process of deriving high-quality information from a text. Furthermore, high-quality information may be derived through the devising of patterns and trends based on statistical pattern learning. In one other example, a static source code parsing and analysis technique may be used for generating the sequence diagram.

In the implementation, the generator module 214 may store the sequence diagram in system data 222.

Classifier Module 216

In the embodiment, upon generation, the classifier module 218 may classify each of the test cases in to an independent test case or an asynchronous test case or a synchronous test case based on the sequence diagram to enable optimization of a test suite by execution time minimization.

In one example, construe test cases T1, T2, T3, T4, T5, T6, T7, T8, T9, and T10. Further, in the example the tests cases comprise of tests steps. The following table 1.1 illustrates the test cases and the respective test steps.

| Sr. NO | Test Case | Test Step |
| --- | --- | --- |
| 1. | T1 | TSA1, TSA2, TSA3 |
| 2. | T2 | TSB1, TSB2, TSB3, TSB4 |
| 3. | T3 | TSC1 |
| 4. | T4 | TSD1, TSD2 |
| 5. | T5 | TSE1, TSE4, TSE5 |
| 6. | T6 | TSE1, TSE3, TSE4, TSE5 |
| 7. | T7 | TSE0, TSE1, TSE2, TSE4, TSE5 |
| 8. | T8 | TSF1, TSF2, TSF3, TSF4, TSF5 |
| 9. | T9 | TSG1, TSG2, TSF3, TSF4, TSF5 |
| 10. | T10 | TSH1, TSH2, TSF3, TSF4, TSF5 |

In the example, the independent test case may be understood as the test case comprising one or more tests steps, where the test steps have zero overlap with one or more tests steps of another tests case. In another example, the independent test case may be understood the tests cases having zero overlap between each other. As shown in table 1.1, T1, T2, T3 and T4 may be classified as independent test cases. In the table, test case T1, T2, T3 and T4 have zero overlap as compared to other test cases T5-T10 i.e. test case T1,T2, T3 and T4 have distinct test steps.

In an example, the asynchronous test case may be understood as the test case comprising one or more tests steps, where the test steps have unsynchronized overlap with one or more tests steps of another tests case. In another example, the asynchronous test case may be understood the tests cases having unsynchronized overlap between each other. As shown in table 1.1, T5, T6, and T7 may be classified as asynchronous test cases. In the table, test case T5, T6, and T7 have unsynchronized overlap i.e. test T5, T6, and T7 have test step overlap at test steps TSE 4, TSE5 but the step position is not synchronized. In the example, TSE4, TSE5 may be understood as a common path for the asynchronous test case.

In an example, the synchronous test case may be understood as the test case comprising one or more tests steps, where the test steps have synchronized overlap with one or more tests steps of another tests case. In another example, the synchronous test case may be understood the tests cases having synchronized overlap between each other. As shown in table 1.1, T8, T9, and T10 may be classified as synchronous test cases. In the table, test case T8, T9, and T10 have synchronized overlap i.e. test T8, T9, and T10 have test step overlap at test steps TSF3, TSF4, TSF5 but the step position are synchronized. In the example, TSF3, TSF4, TSF5 may be understood as a common path for the synchronous test case.

In another example, a minimum common path algorithm may be used for the test cases classification. In the example, the minimum common path algorithm may identify a common path based on the step identification number. Further, in an example, the test cases may be classified based on the common path and a predefined criterion. In one example, the predefined criterion may include a longest common path. In another example, the predefined criterion may include a smallest common path but maximum number of test cases. In one example, the predefined criterion may include maximum number of test cases sharing common path. In another example, a predefined criterion may also include an entry criterion and an exit criterion.

In one more example, the minimum common path algorithm may be used for identifying a common path. Further a custom algorithm may be used for evaluating common entry and exit criterion of the test cases that share the common path. Further, based on the evaluation the each of the plurality of test cases may be classified in to an independent test case or an asynchronous test case or a synchronous test case.

In the implementation, the classifier module 218 may store the classified test cases in system data 222. Further, the classifier module 218 may provide the classified tests cases the user for effective planning, thus enabling tests suite optimization by execution time minimization. In one more implementation, the sequence diagrams may also be provided to the user for visualization. In one more implementation, the test step master list may be provided, where in the test step master list comprises tests cases grouped as the independent test case or the asynchronous test case or the synchronous test case.

Exemplary embodiments discussed above may provide certain advantages. Though not required to practice aspects of the disclosure, these advantages may include those provided by the following features.

Some embodiments enable the system and the method to reduce the overall test suite enabling test suite optimization.

Some embodiments enable the system and the method to reduce the overall test cycle without compromising the quality of the test.

Some embodiments enable the system and the method to increase testing productivity.

Some embodiments enable the system and the method to identification of bugs.

Some embodiments enable the system and the method to improve time to market of the software system.

Figure 3:
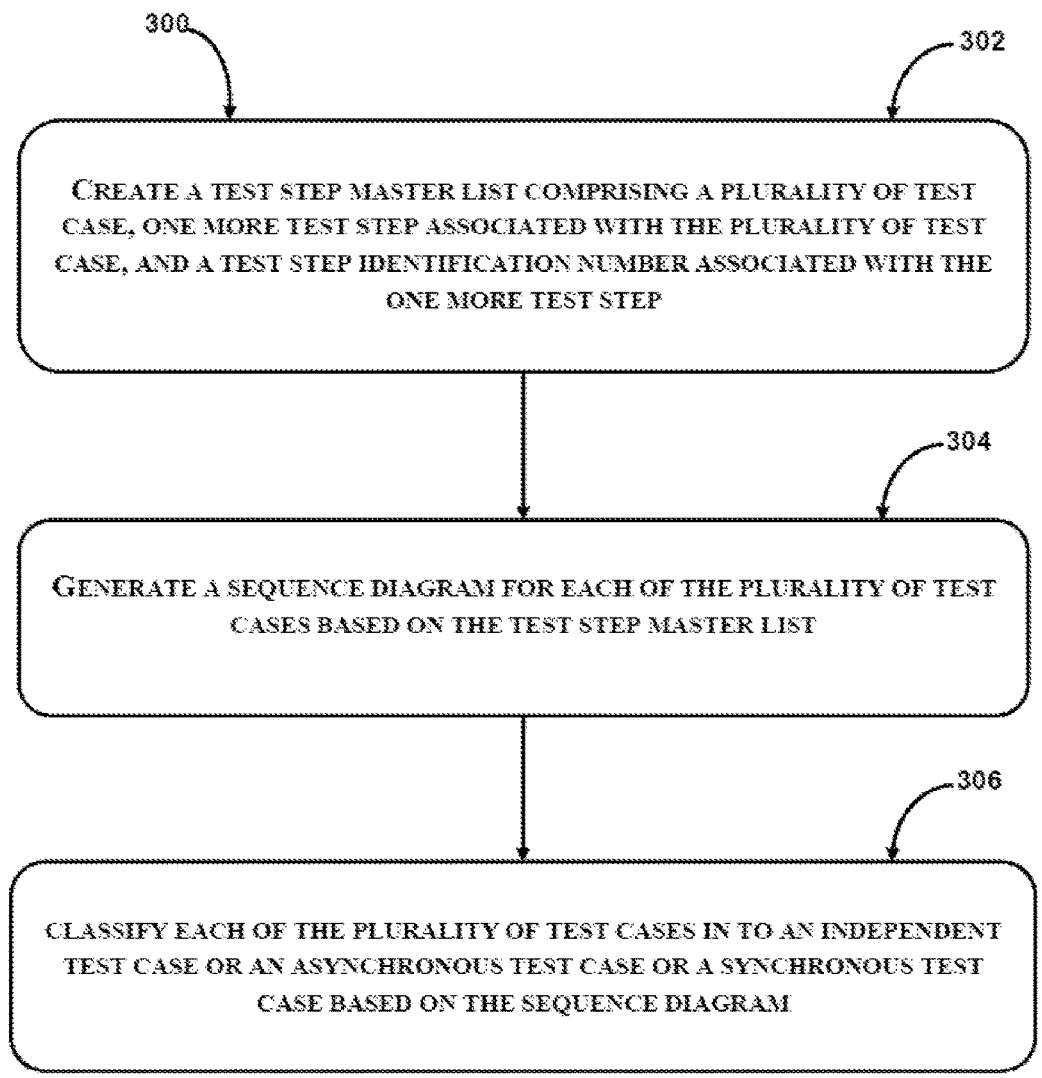
FIG. 3 illustrates a method for classifying the plurality of test case, in accordance with an embodiment of the present subject matter.

Referring now to FIG. 3, a method 300 for classifying a test case is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a test step master list is created. The test step master list comprises a plurality of test case, one more test step associated with the plurality of test case, and a test step identification number associated with the one more test step. In an implementation, the test step master module 212 may create a test step master list and store the test step master list in system data 222.

At block 304, a sequence diagram is generated. Further, the sequence diagram is generated for each of the plurality of test cases based on the test step master list. In the implementation, the generator module 214 may generate a sequence diagram for each of the plurality of test cases and store the sequence diagram in system data 222.

At block 306, the pluralities of test cases are classified. Further, the pluralities of test cases may be classified in to an independent test case, an asynchronous test case, or a synchronous based the sequence diagram. In the implementation, the classifier module 216 may classify the pluralities of test cases in to an independent test case, an asynchronous test case, or a synchronous and store the classified test cases in system data 222.

Exemplary embodiments discussed above may provide certain advantages. Though not required to practice aspects of the disclosure, these advantages may include a method for classifying a plurality of test case enabling test suite minimization.

Although implementations for methods and systems for classifying a test case have been described in language specific to structural features and/or methods, it is to be understood that the appended claims are not necessarily limited to the specific features or methods described. Rather, the specific features and methods are disclosed as examples of implementations classifying a plurality of test case enabling test suite minimization.

We claim:

1. A method for classifying a plurality of test cases to enable test suite minimization, the method comprising:
  creating, by a processor, a test step master list comprising a plurality of test steps, wherein each test step is associated with one or more test cases from a plurality of test cases in a test suite associated with a software, and a test step identification number associated with each of the test steps;
  generating, by the processor, a sequence diagram for each of the plurality of test cases based on the test step master list; and
  classifying, by the processor, each of the plurality of test cases as at least one of an independent test case, an asynchronous test case, and a synchronous test case based on the sequence diagram, wherein the plurality of test cases are classified based on a minimum common path algorithm, a predefined criterion, and a common path between test cases based on the step identification number, wherein the common path includes test steps included in multiple test cases of the plurality of test cases and is based on the step identification number, wherein the common path is identified using the minimum common path algorithm, wherein the test cases with no common path are classified as independent test cases, wherein the test cases with common path at different position are classified as asynchronous test cases, and wherein the test cases with common path at same position are classified as synchronous test cases, wherein the classified test cases are stored in system data for effective planning, of the software tests;
  mining, by a processor, one of an execution repository and a bug repository for data utilizing one of an Apriori technique, an equivalence class transformation technique, a frequent pattern growth technique, and an Apriori-DP technique;
  identifying, by a processor, one or more duplicate test case from the test step master list based on the data; and
  deleting, by a processor, the one or more duplicate test case from the test step master list based on the data.

2. The method of claim 1, further comprising:
  obtaining, by a processor, the plurality of test cases from a test repository;
  extracting, by a processor, the one or more test steps from each of the plurality of test cases; and
  assigning, by a processor, the test step identification number to the one or more test step, and wherein the step identification number is indicative of an unique number.

3. The method of claim 1, wherein the test step master list is created utilizing one of a regular expressions technique, and a text parsing technique.

4. The method of claim 1, wherein the sequence diagram is generated utilizing one of a text mining parsing technique, and a static source code parsing analysis technique.

5. The method of claim 1, wherein the predefined criterion corresponds to one of: a longest common path, a smallest common path with maximum number of test cases, a maximum number of test cases sharing common path, and an entry criterion and an exit criterion of the test cases that share the common path.

6. The method of claim 1, wherein the independent test case is indicative of zero overlaps between the plurality of test cases.

7. The method of claim 1, wherein the asynchronous test case is indicative of unsynchronized overlap between the plurality of test cases.

8. The method of claim 1, wherein the synchronous test case is indicative of synchronized overlap between the plurality of test cases.

9. A system for classifying a plurality of test cases to enable test suite minimization, the system comprising:
  a memory; and
  a processor coupled to the memory, wherein the processor is capable of executing instructions to perform steps of:
  creating a test step master list comprising a plurality of test steps, wherein each test step is associated with one or more test cases from a plurality of test cases in a test suite associated with a software, and a test step identification number associated with each of the test steps;
  generating a sequence diagram for each of the plurality of test cases based on the test step master list; and
  classifying each of the plurality of test cases as at least one of an independent test case, an asynchronous test case, and a synchronous test case based on the sequence diagram, wherein the plurality of test cases are classified based on a minimum common path algorithm, a predefined criterion, and a common path between test cases based on the step identification number, wherein the common path includes test steps included in multiple test cases of the plurality of test cases and is based on the step identification number, wherein the common path is identified using the minimum common path algorithm, wherein the test cases with no common path are classified as independent test cases, wherein the test cases with common path at different position are classified as asynchronous test cases, and wherein the test cases with common path at same position are classified as synchronous test cases, wherein the classified test cases are stored in system data for effective planning of software tests, whereby the classified test cases, during test execution, minimize the test suite and thereby resulting in improved test execution productivity;

mining, by a processor, an execution repository and a bug repository for data utilizing one of a Apriori technique, an equivalence class transformation technique, a frequent pattern growth technique, and an Apriori-DP technique;

identifying, by a processor, one or more duplicate test case from the test step master list based on the data; and deleting, by a processor, the one or more duplicate test case from the test step master list based on the data.

10. The system of claim 9, wherein the processor is further capable of executing instructions to perform steps of: obtaining, by a processor, the plurality of test cases from a test repository; extracting, by a processor, the one or more test steps from each of the plurality of test cases; and assigning, by a processor, the test step identification number to the one or more test step, and wherein the step identification number is indicative of an unique number.

11. The system of claim 9, wherein the test step master list is created utilizing one of a regular expressions technique, and a text parsing technique.

12. The system of claim 9, wherein the sequence diagram is generated utilizing one of a text mining parsing technique, and a static source code parsing analysis technique.

13. The system of claim 9, wherein the predefined criterion corresponds to one of: a longest common path, a smallest common path with maximum number of test cases, a maximum number of test cases sharing common path, and an entry criterion and an exit criterion of the test cases that share the common path.

14. The method of claim 9, wherein the independent test case is indicative of zero overlaps between the plurality of test cases.

15. The method of claim 9, wherein the asynchronous test case is indicative of unsynchronized overlap between the plurality of test cases.

16. The method of claim 9, wherein the synchronous test case is indicative of synchronized overlap between the plurality of test cases.

17. A non-transitory computer program product having embodied thereon a computer program for classifying a plurality of test cases to enable test suite minimization, the computer program product storing instructions, the instructions comprising instructions for:

obtaining, by a processor, a plurality of test cases from a test repository;

extracting, by a processor, a one or more test steps from each of the plurality of test cases; and assigning, by a processor, a test step identification number to the one or more test step, and wherein the step identification number is indicative of an unique number;

creating a test step master list comprising a plurality of test steps, wherein each test step is associated with one or more test cases from a plurality of test cases in a test suite associated with a software, and a test step identification number associated with each of the test steps, wherein the test step master list is created utilizing one of a regular expressions technique, and a text parsing technique;

generating a sequence diagram for each of the plurality of test cases based on the test step master list, wherein the sequence diagram is generated utilizing one of a text mining parsing technique, and a static source code parsing analysis technique; and classifying each of the plurality of test cases as at least one of an independent test case, an asynchronous test case, and a synchronous test case based on the sequence diagram, wherein the plurality of test cases are classified based on a minimum common path algorithm, a predefined criterion, and a common path between test cases based on the step identification number, wherein the common path includes test steps included in multiple test cases of the plurality of test cases and is based on the step identification number, wherein the common path is identified using the minimum common path algorithm, wherein the test cases with no common path are classified as independent test cases, wherein the test cases with common path at different position are classified as asynchronous test cases, and wherein the test cases with common path at same position are classified as synchronous test cases, wherein the classified test cases are stored in system data for effective planning, of the software tests;

mining, by a processor, an execution repository and a bug repository for data utilizing one of an Apriori technique, an equivalence class transformation technique, a frequent pattern growth technique, and an Apriori-DP technique;

identifying, by a processor, one or more duplicate test case from the test step master list based on the data; and deleting, by a processor, the one or more duplicate test case from the test step master list based on the data.

* * * * *